United States Patent [19]

Carren

[11] 4,168,846
[45] Sep. 25, 1979

[54] TRICYCLE CONSTRUCTION

[75] Inventor: Thomas G. Carren, Woodside, N.Y.

[73] Assignee: PCA Industries, Inc., Long Island City, N.Y.

[21] Appl. No.: 831,071

[22] Filed: Oct. 25, 1977

[51] Int. Cl.² .................. B62K 19/12; B62K 19/24
[52] U.S. Cl. ................................... 280/278; 280/282; 280/287; 403/388
[58] Field of Search ............... 280/282, 278, 287, 274; 403/108, 107, 387, 388

[56] References Cited

U.S. PATENT DOCUMENTS

| D. 231,346 | 4/1974 | Baynes | 280/282 |
| 1,598,869 | 9/1926 | McCann | 280/282 |
| 2,948,551 | 8/1960 | Duvall | 280/287 |
| 3,096,100 | 7/1963 | Clarke et al. | 280/282 |
| 3,123,379 | 3/1964 | Stocking | 280/282 |

*Primary Examiner*—Joseph F. Peters, Jr.
*Assistant Examiner*—Donn McGiehan

[57] ABSTRACT

A novel tricycle wherein a seat and rearward wheel assembly are movable together and are variably secured to a central frame section toward or away from the forward wheel and handlebars in order to accommodate various sizes of riders while maintaining the same weight distribution of riders with respect to the rear wheels.

4 Claims, 3 Drawing Figures

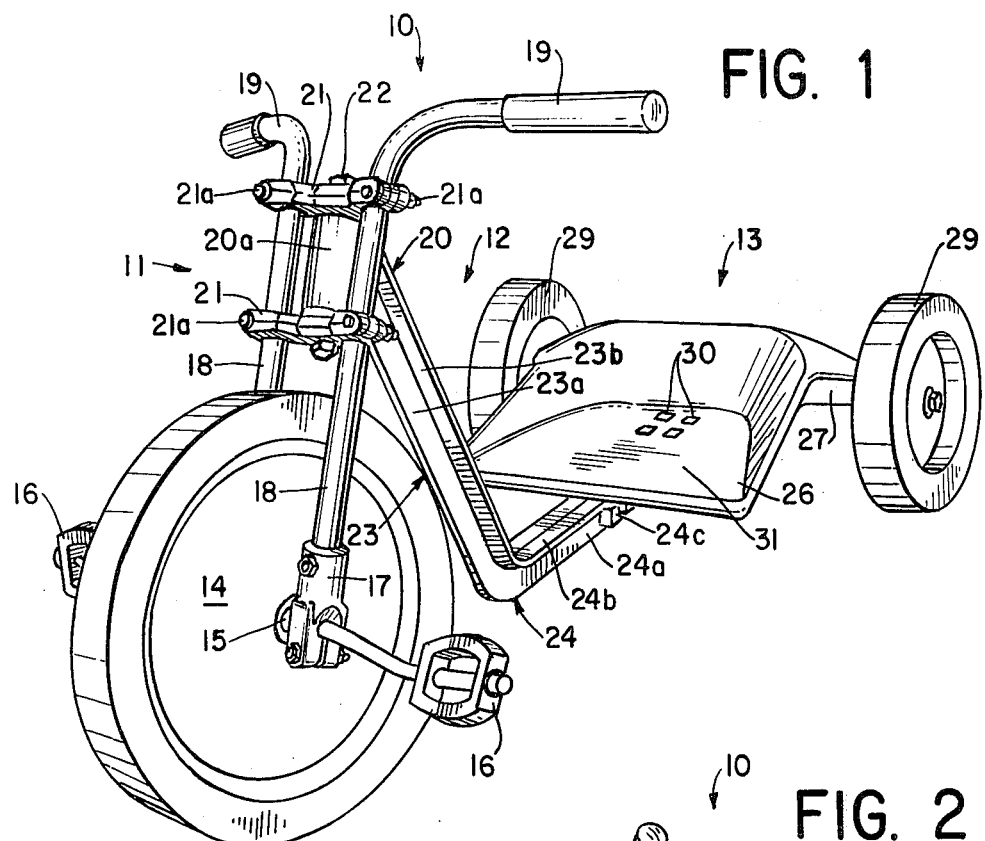
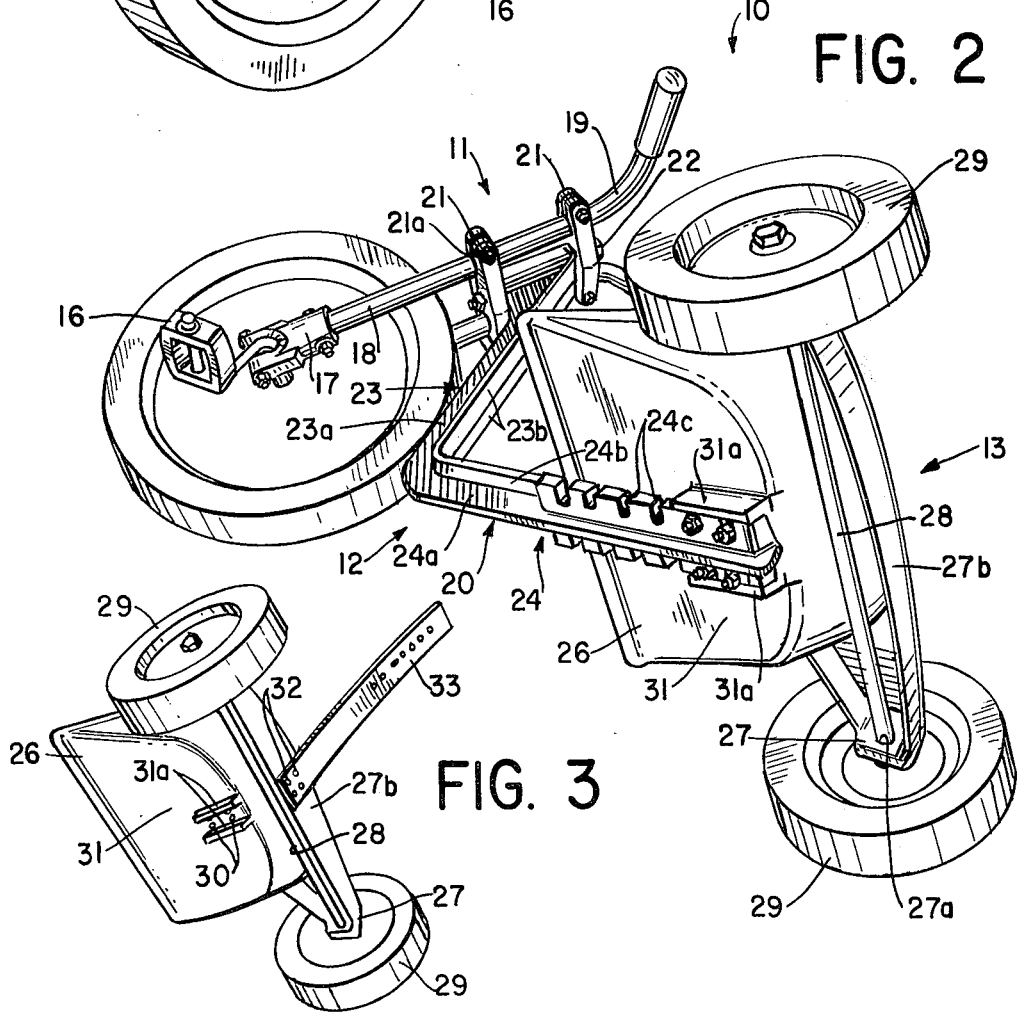

TRICYCLE CONSTRUCTION

BACKGROUND OF THE INVENTION

Tricycle constructions are designed optimally to provide both lateral and longitudinal stability. Upon consideration, it will be apparent that weight placement (the rider's weight) along the longitudinal axis of the central frame section will greatly affect both lateral and longitudinal stability. Obviously, if the rider's weight be placed above the front wheel, both lateral and longitudinal stability would be lost. Likewise, if the seat were to be placed directly above the rear wheels, longitudinal stability would essentially be lost.

Instability occurs therefore to a greater or lesser extent when the tricycle seat is made adjustable to accommodate different sizes of riders. Usually such adjustments are purposely quite limited along the longitudinal axis of the central frame since space is limited and because of the possibility that more than limited movement will produce excessive instability.

Various solutions respecting seat positioning can be seen in U.S. Pat. Nos. 1,598,869; 3,096,100; and 3,123,379. Although each of these patents discloses some means for moving a tricycle seat longitudinally, in each case such movement is independent of the rear wheels. It is the purpose of the present invention to disclose a tricycle construction where seat and rear wheels may be shifted longitudinally as a unit, and furthermore to disclose means to vary not only seat position but overall body length of the tricycle.

SUMMARY OF THE INVENTION

In accordance with the present invention, there is disclosed a novel tricycle comprising a central frame section, a forward wheel and handlebar assembly mounted for pivotal steering movement relative to and at one end of said central frame section and a rearward assembly, including a mounting frame, a seat and two rear wheels. Means are provided for adjustably securing the rearward assembly to the central frame section to permit attachment of the rearward assembly in various longitudinal positions along the central frame section toward and away from the forward wheel and handlebar assembly. By this adjustable means, the length of the tricycle is made variable to accommodate different sizes of riders; however, since the seat always remains in the same spacial relationship with respect to the rear wheels and the seat and rear wheels are moved together along the central frame section, the rider's weight therefore always remains in the same relative position with respect to the rear wheels, thus providing great lateral and longitudinal stability.

BRIEF DESCRIPTION OF THE DRAWINGS

FIG. 1 is a perspective view showing the novel tricycle configuration of the present invention in its upright position with the view having been taken from the side, slightly forward of the tricycle;

FIG. 2 is a perspective view of the tricycle of FIG. 1 taken from beneath the tricycle and slightly to the rear; and FIG. 3 is a perspective view of a tricycle seat and rear wheel assembly similar to that shown in FIG. 2 and including body-torso support and mounting means.

DESCRIPTION OF A PARTICULAR EMBODIMENT

Referring now to the drawing, a tricycle 10 constructed according to principles of the invention has been illustrated. The tricycle 10 includes a forward wheel and handlebar assembly 11, a central chassis or frame section 12 and a rearward assembly 13. The forward wheel and handlebar assembly includes the wheel 14, whose axle 15, extended portions of which form part of peddle assemblies 16, are received in crank-bearing holders 17 for rotation therein. Crank-bearing holders 17 are secured to the lower end of vertical members 18, the upper extensions of which form handlebars 19.

The central frame section 12 is in the form of a single cast member 20, one extremity of which 20a is cylindrical and is equipped internally with bearings. Braces 21 tie vertical members 18 together, being secured thereto by bolts 21a. The cylinder 20a of central frame section 20 is received between braces 21 and secured thereto by a bolt 22 which passes through the cylinder 20a. The frame 20 is thus rendered pivotable with respect to the forward wheel and handlebar assembly.

From its point of attachment at cylinder 20a to the forward wheel and handlebar assembly 11, the central frame includes a section 23 slanting diagonally downwardly and rearwardly to join a horizontal section 24. Sections 23 and 24 are of a one-piece construction having been cast as a "T" section. Each section has opposing flanges 23b and 24b respectively forming the top of the "T", and depending therefrom are vertical webs of the "T" 23a and 24a. Flanges 24b are provided with a series of lingitudinally spaced openings or notches 24c.

The rearward assembly 13 includes a cast, bucket-type seat 26 having integral lateral extensions 27, which have aligned apertures 27a for the reception of a rear axle 28 which mounts rear wheels 29.

In accordance with the present invention, it will be seen that the seat 26 includes four bolt-receiving apertures 30 which extend through a flat base portion 31 and are spaced to match paired adjacent ones of the notches 24c of flanges 24b of the central frame section. Accordingly, the seat and rear wheel assembly as a unit can be variably attached along the section 24 to accommodate different sizes of riders. The flat mounting base portion 31 slidably rests upon the upper surface of section 24, and additionally, immediately adjacent to such mounting base portion the underside of seat 26 will be provided with depending members 31a whose function is to straddle and closely encompass horizontal component 24b and to prevent skewing of the seat 26. As shown in FIG. 3, lateral extensions 27 adjacent to seat 26 may be widened to form flange 27b defining receiving apertures 32 for mounting a narrow vertical body-torso support 33. The body-torso support may be equipped with a seat belt (not shown) to secure the rider in the seat.

It will be noted that due to the foregoing adjustment, the length of the tricycle is rendered variable while the weight distribution of the rider with respect to the rear wheels remains constant, since the rear wheels and seat move as a unit during such variable length adjustment.

It will be understood that the foregoing description has been of a particular embodiment and is therefore merely representative. In order to understand the scope of the invention, reference should be made to the appended claims.

I claim:

1. A tricycle construction comprising, a central frame section, a forward wheel and handlebar assembly mounted for pivotal steering movement relative to and at one end of said central frame section of one-piece construction, a rearward assembly including two rear wheels and a rear wheel mounting frame and seat of one-piece construction, said central frame section including a "T" section having two oppositely extending flanges and a depending web, said flanges provided with a plurality of longitudinally spaced openings, said seat provided with a plurality of apertures spaced to correspond to the spacing of selected ones of said flange openings, said seat apertures and flange openings being adapted to receive bolts to adjustably secure said seat longitudinally along said central frame section.

2. The tricycle construction according to claim 1 wherein said flange openings are notches.

3. The tricycle construction according to claim 2 wherein the underside of said seat includes a flat mounting surface adapted to slidably rest upon the flanged portion of said "T" section, and members depending adjacent to said flanges to closely straddle said "T" section to prevent skewing of said seat relative to said central frame section.

4. The tricycle construction according to claim 3 wherein said seat includes lateral wheel mounting extensions, a body-torso support and means for mounting said support to said wheel mounting extensions in vertical relationship to said seat.

* * * * *